(12) United States Patent
Mecham et al.

(10) Patent No.: US 6,314,340 B1
(45) Date of Patent: Nov. 6, 2001

(54) IRRIGATION CONTROLLER

(75) Inventors: Brent Q. Mecham, Loveland, CO (US); Darrel Walker, Richardson, TX (US); Matt Piper, Dallas, TX (US); Michael O. Snoddy, Mesquite, TX (US)

(73) Assignee: Telsco Industries, Garland, TX (US)

( * ) Notice: Subject to any disclaimer, the term of this patent is extended or adjusted under 35 U.S.C. 154(b) by 0 days.

(21) Appl. No.: 09/184,527

(22) Filed: Nov. 2, 1998

(51) Int. Cl.$^7$ .................................................. G05D 11/00
(52) U.S. Cl. ................................ 700/284; 700/17; 239/69
(58) Field of Search ..................................... 700/184, 306, 700/14–17; 219/121.67–121.69, 121.61; 239/69, 70; 137/624.11

(56) References Cited

U.S. PATENT DOCUMENTS

| | | | | |
|---|---|---|---|---|
| 4,569,020 | * | 2/1986 | Snoddy et al. | 364/420 |
| 4,646,224 | * | 2/1987 | Ransburg et al. | 700/184 |
| 4,883,200 | * | 11/1989 | Miller et al. | 222/77 |
| 5,020,275 | * | 6/1991 | Bednarzik | 47/79 |
| 5,023,787 | | 6/1991 | Evelyn-Veere | 47/79 |
| 5,097,861 | | 3/1992 | Hopkins et al. | 374/54 |
| 5,208,855 | | 5/1993 | Marian | 137/78.2 |
| 5,229,937 | | 7/1993 | Evelyn-Veere | 239/69 |
| 5,241,786 | | 9/1993 | Burns et al. | 700/16 |
| 5,251,153 | | 10/1993 | Nielsen et al. | 700/284 |
| 5,361,534 | | 11/1994 | Burns et al. | 137/78.3 |
| 5,400,815 | | 3/1995 | Whitehill | 700/284 |
| 5,421,515 | | 6/1995 | Rinkewich | 700/284 |
| 5,479,339 | | 12/1995 | Miller | 369/247 |
| 5,496,112 | | 3/1996 | Browne | 47/79 |
| 5,668,719 | | 9/1997 | Bobrov et al. | 239/68 |
| 5,696,671 | | 12/1997 | Oliver | 700/284 |

OTHER PUBLICATIONS

Hargreaves, George H., "Defining and Using Reference Evapotranspiration", Journal of Irrigation and Drainage Engineering, vol. 120, No. 6, pp. 1132–1139, Nov./Dec. 1994.

* cited by examiner

*Primary Examiner*—William Grant
*Assistant Examiner*—Kidest Bahta
(74) *Attorney, Agent, or Firm*—Jenkens & Gilchrist (57) ABSTRACT

An irrigation controller collects daily high and low temperature data. The controller then processes this collected temperature data in accordance with the Hargreaves equation to determine a reference evapotranspiration value. The controller further adjusts the reference evapotranspiration value to account for the type of vegetation at the site and a localized Hargreaves equation deviation factor to generate an adjusted evapotranspiration value which represents an estimation of the current watering needs for the specific plants at that specific site. The controller then divides the locally adjusted evapotranspiration value by a sprinkler head average precipitation rate to determine a run time for irrigation. Irrigation for the site is then initiated lasting for the duration of the determined run time.

29 Claims, 5 Drawing Sheets

IRRIGATION CONTROLLER

BACKGROUND OF THE INVENTION

1. Technical Field of the Invention

The present invention relates to landscape and agricultural irrigation and, in particular, to a system and method for controlling irrigation.

2. Description of Related Art

Automatic sprinkling systems are well known in the art. These systems typically operate in a manner where the user specifies a certain time for starting a watering cycle as well as a length of time that each specified watering cycle (in perhaps each of a number of watering zones) should last. In most situations, the user makes an initial best guess as to the watering needs of the vegetation, and sets a watering time based on that guess. Thereafter, the user monitors the health of the plants and condition of the soil in each watering zone to make adjustments to the initial guess as to watering needs and causing corresponding adjustments to the specified watering time for each zone. Ideally, an automatic sprinkler system should return to the vegetation only as much water as has been lost through either evaporation from the soil or transpiration from the plant. This manual guessing process for specifying sprinkling durations is notoriously inaccurate. In fact, some estimates indicate that automatic sprinkler users over-water their vegetation by as much as a thirty to forty percent (30–40%) factor.

The term "evapotranspiration" (ET) refers to the amount of water a plant uses or needs in order to maintain growth. The climatic information commonly used to calculate an evapotranspiration value include temperature, solar radiation, wind speed, and vapor pressure or humidity. This climatic information is generally collected by a full service weather station and processed in one of a number of known complex formulas or equations to calculate the evapotranspiration value. One example of such an equation recognized in the agriculture industry for accuracy in measuring evapotranspiration using weather station collected climatic information is the well-known Penman-Monteith or modified Penman equations (hereafter referred to as "modified Penmans").

Weather station collected climatic information that is useful for Penman-Monteith, modified Penmans or other weather station climatic information driven evapotranspiration equation processing is widely available from a number of sources including State agriculture agencies, County extension services and the Internet. However, it is recognized that since collected weather station climatic information is valid for only the precise site (or immediately surrounding geographic area) of the weather station, any Penman-Monteith, modified Penmans or other equation evapotranspiration value calculated from that weather station climatic information is similarly valid for only that specific site (and perhaps its immediately surrounding geographic area). The collected climatic information along with any evapotranspiration equation value calculated therefrom is accordingly of little (if any) accurate use to a farmer or land owner located tens or hundreds of miles away from, or perhaps nearby but at a different elevation than, the site of the weather station, or perhaps nearby but affected by localizes conditions such as man-made structures, forests and the like which affect evapotranspiration.

To make complete and accurate use of the Penman-Monteith, modified Penmans or other similar evapotranspiration equation, a person would thus have to purchase and install at their site a full service weather station capable of measuring the proper climatic information. For a small farmer or land owner, purchasing a weather station may not present a viable, economically feasible solution. It is thus further recognized that the Penman-Monteith, modified Penmans or similar equation is of little practical use to a person who cannot gain access to all the of the requisite, site specific climatic information needed for input to the equation. As such, these weather station climatic information driven equations are of great academic interest but provide little real-world benefit.

Considerable effort has accordingly been expended in developing evapotranspiration formulas which mimic the results provided by the weather station climatic information driven (e.g., Penman-Monteith, modified Penmans) equations, but do not require access to such large amounts of specific weather station collected climatic information. More specifically, there is a need for an accurate evapotranspiration formula which requires for its input data climatic information that is easily and inexpensively collectable at the specific site where the vegetation at issue is located. One such formulation comprises the Hargreaves equation as set forth below:

$$ET_o = 0.00009 \times RA \times (T° C. + 17.8) \times TD^{0.50}$$

wherein:

$ET_o$=reference evapotranspiration (in inches of water per day); and

RA=extraterrestrial radiation expressed in equivalent evaporation (in inches of water per day);

or:

$$ET_o = 0.0023 \times RA \times (T°C. + 17.8) \times TD^{0.50}$$

wherein:

$ET_o$=reference evapotranspiration (in millimeters of water per day); and

RA=extraterrestrial radiation expressed in equivalent evaporation (in millimeters of water per day);

and further wherein:

$T° C.$ = average daily temperature

= (Tmax + Tmin)/2; and $TD$ = daily temperature differential

= Tmax − Tmin.

See, George H. Hargreaves, "Defining and Using Reference Evapotranspiration", Journal of Irrigation and Drainage Engineering, vol. 120, no. 6, November/December 1994. A primary advantage obtained from use of the Hargreaves equation is that the only climatic information that needs to be collected by the user and thereafter processed to determine a reference evapotranspiration value comprises local temperature data (high, low and differential). This data may be easily and inexpensively collected using either an automatic or a manual temperature sensing mechanism. The extraterrestrial radiation (RA) value reflects the evaporation resulting from the amount of the sun's radiation which reaches the earth's surface. While this extraterrestrial radiation caused evaporation value changes daily (due to day-to-day weather changes, the tilt in the earth's axis and the yearly rotation of the earth about the sun), it is recognized that a value calculated based on the latitude of the site provides a suitable approximation. Tables providing monthly latitude based extraterrestrial radiation value information are published and widely available from a number of sources. The remaining components of the Hargreaves equation are advantageously constants.

While the Hargreaves equation has been shown to mimic the results provided by the Penman-Monteith, modified Penmans and other recognized weather station climatic information driven evapotranspiration equations (see, George H. Hargreaves, "Defining and Using Reference Evapotranspiration", Journal of Irrigation and Drainage Engineering, vol. 120, no. 6, November/December 1994), at many geographic locations and at certain times of the year, the reference evapotranspiration values output from the Hargreaves equation are noticeably inaccurate. As such, the Hargreaves equation has not been relied upon as a practical tool for calculating evapotranspiration and specifying irrigation needs. The benefits that accrue from having to only measure temperature at the site in order to calculation evapotranspiration, however, weigh in favor of its use (subject, of course, to an improvement in its accuracy). What is needed is an apparatus and method for implementing the Hargreaves equations for more accurate calculation of evapotranspiration values in connection with the use of an automatic irrigation controller.

SUMMARY OF THE INVENTION

Daily high and low temperature data is collected at the site of an irrigation controller. This temperature data is then processed, along with extraterrestrial radiation influenced equivalent evaporation data, in accordance with the Hargreaves equation, to determine a reference evapotranspiration value which represents an estimation of the current watering needs of a certain reference vegetation at the site. The reference evapotranspiration value is then adjusted by a local deviation factor specific to the site which affects evapotranspiration rates to generate an adjusted evapotranspiration value. More particularly, this local deviation factor accounts for any deviation between actual evapotranspiration or weather station climatic information driven evapotranspiration and the Hargreaves equation calculated evapotranspiration, and thus adjusts for localized errors in the application of the Hargreaves equation. The locally adjusted evapotranspiration value is then further adjusted, for example, to account for the type of vegetation at the site to generate a net evapotranspiration value representing an estimation of the current watering needs for the specific plants at that specific site. The net evapotranspiration value is then divided by a sprinkler head average precipitation rate to determine a run time for irrigation. The controller then irrigates the site for the duration of the determined run time necessary to satisfy the watering needs of the vegetation. This calculation of run time may be implemented on either a per zone or per sprinkler head basis.

In one embodiment of the present invention, a stand-alone irrigation controller is provided with the capability for measuring temperature and implementing the Hargreaves equation with a local deviation adjustment that improves Hargreaves accuracy. In another embodiment of the present invention, a modular controller is provided comprising a host controller selectively connected to at least one evapotranspiration module. When no evapotranspiration module is connected, the host controller functions in a conventional irrigation controller fashion with the user specifying run times. When the evapotranspiration module is connected, the host controller instead functions to determine requisite irrigation run times and to control irrigation actuation in accordance with Hargreaves equation specified evapotranspiration values calculated by the evapotranspiration module and adjusted by the local deviation. When multiple evapotranspiration modules are connected to a single controller, more precise calculation of run times at each site may be made to account for temperature differentials across site caused by factors such as shade, concrete, vegetation density, proximity to buildings, and the like.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
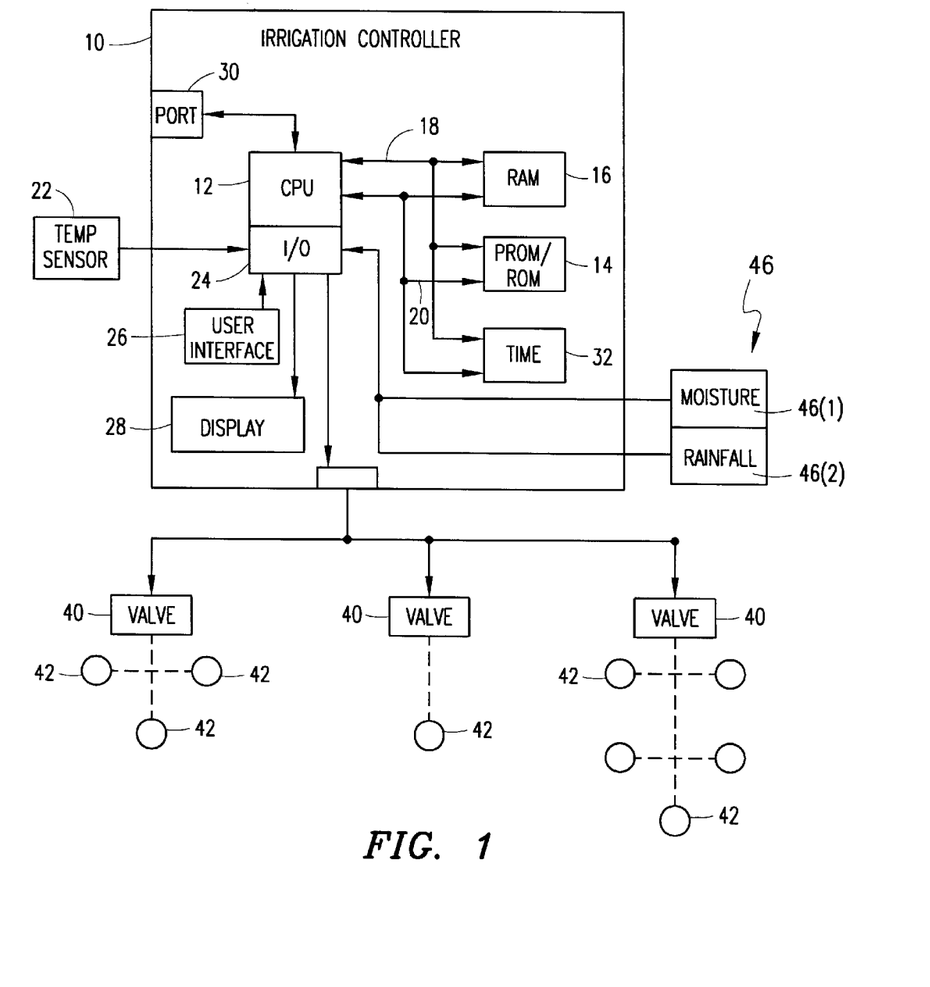
FIG. 1 is a block diagram of an irrigation controller in accordance with the present invention.

Reference is now made to FIG. 1 wherein there is shown a block diagram of a first embodiment of an irrigation controller 10 in accordance with the present invention. The controller 10 includes microprocessor (CPU) 12, a programmable read only memory (ROM/PROM) 14 and a random access memory (RAM) 16. The ROM/PROM 14 provides a non-volatile storage location for the programming code of the controller along with certain important (permanent) data necessary for execution of the code. The RAM 16 provides a volatile storage location for certain (variable/temporary) data generated during execution of the programming code. The microprocessor 12 communicates with the ROM/PROM 14 and RAM 16 in a conventional manner utilizing an address bus 18 and a data bus 20. It will be understood that the ROM/PROM 14 and RAM 16 may be incorporated integrally within, or provided separate and apart from, the microprocessor 12.

A temperature sensor 22 is further provided for the controller 10, and is connected to the microprocessor 12 through an input/output (I/O) interface 24. In accordance with the operation of the programming code, temperature data collected by the sensor 22 is passed through the interface 24 at the request of the microprocessor 12 and stored by in the RAM 16. This temperature data is then subsequently retrieved from the RAM 16 and processed by the microprocessor 12 in accordance with the execution of the programming code to determine an amount of water which needs to be applied to replace water lost through the effects of evapotranspiration.

A user interface 26 for supporting data entry into the controller 10 is connected to the microprocessor 12 through the I/O interface 24. Examples of suitable user interface devices include a keypad, touch screen, graphic user interface, dial and switch. Data entry may further occur using a serial data download as discussed in further detail below. Input data may, if necessary, be stored in the RAM 16. The kinds of data input into the controller 10 include: a preferred time of day when irrigation is to be effectuated; a preferred day (or days) of the week when irrigation is to be effectuated; an identification of soil type for the irrigated area; an identification of the vegetation type (crop coefficient); controller 10 site latitude; sprinkler flow rates; and, a local irrigation adjustment factor. The user interface 26 may further be utilized to initiate certain microprocessor 12 and controller 10 activities (such as, for example, an irrigation, a self test, or the like) without regard to the current state of programming code execution.

A display 28 (such as an LCD display) for supporting visual data presentation by the controller 10 is also connected through the I/O interface 24 to the microprocessor 12. Through the display 28, the controller 10 may present time, day and date information. The display 28 may further be utilized by the microprocessor 12 to present a variety of menus for user consideration when entering data into the controller 10, or inform the user concerning the status or state of controller operation.

A serial communications port 30 is connected to (or is incorporated in) the microprocessor 12 to support communications between the controller 10 and external devices such as a personal/laptop computer (not shown). Through this serial port 30, the programming code (and data) stored in the ROM/PROM 14 may be updated and data may be extracted from or downloaded to the RAM 16. As an example, a table of extraterrestrial radiation influenced equivalent evaporation data for each month/day of the year at a plurality of latitudes may be downloaded into the ROM/PROM 14 or RAM 16 through the serial port 30. The serial port 30 further allows a technician to have access to the microprocessor 12 for the purpose of performing diagnostic and maintenance operations on the controller 10.

A time of day clock 32 is connected to the microprocessor 12 through the address bus 18 and data bus 20. This clock 32 maintains a non-volatile record of month, day, hour of the day, minutes of the hour and seconds of the minute. The clock 32 generated and output time data is monitored by the microprocessor 12 with the time data driving certain operations in accordance with the programming code. These operations include: reading and storing temperature data; initiating and stopping irrigation activities; and, performing certain irrigation related calculations (as will be described).

In accordance with the execution of the programming code, the microprocessor 12 outputs irrigation control signals through the I/O interface 24 to control the actuation of irrigation control valves 40. These control valves 40 operate to either allow or block the passage of water to one or more sprinkler heads 42. The length of time each irrigation control valve 40 (i.e., zone) is actuated to allow the passage of water is calculated by the microprocessor 12 in accordance with the execution of the programming code.

The controller 10 further optionally receives input from other sensors 46 through the I/O interface 24. An example of such a sensor is a moisture sensor 46 (1). When the moisture sensor 46 (1) detects moisture, this is indicative of a rainfall event. During such a rainfall event, a signal is passed through the interface 24 and the microprocessor 12 responds thereto by temporarily suppressing controller 10 actuation to sprinkle. Another example of such a sensor is a rainfall gauge 46 (2). Using rainfall information collected by the rainfall gauge sensor 46 (2) and passed through the interface 24, the microprocessor 12 adjusts (i.e., reduces) its programming code calculated irrigation amount of water which needs to be applied to replace water lost through the effects of evapotranspiration.

The daily temperature data of importance to the Hargreaves equation (high, low and differential) is calculated by the microprocessor 12 from the temperature information collected by the sensor 22 and stored in the RAM 16. The latitude of the controller site is input by the user into the RAM 16. Using this latitude data, date (month or day) sensitive equivalent evaporation data of importance to the Hargreaves equation is determined from a latitude based extraterrestrial radiation table stored in the ROM/PROM 14. A reference evapotranspiration value is then determined from the Hargreaves equation (and is perhaps summed over a plurality of days since a last irrigation) at instances when an irrigation event occurs. This reference evapotranspiration value is then adjusted by a local adjustment coefficient to account for presumed average variation between the Hargreaves equation calculated watering needs and either (1) actual watering needs or (2) Penman-Monteith, modified Penmans or other similar evapotranspiration equation calculated watering needs. The local adjustment coefficient is estimated and input by the user in the RAM 16. The value of this local adjustment coefficient is affected by factors such as site altitude, site shade conditions, local weather patterns and characteristics (humidity, aridity and the like), drainage and topology. The locally adjusted evapotranspiration value is then adjusted by the crop coefficient to account for the specific type of vegetation being sprinkled. The crop coefficient is input by the user into the RAM 16. Next, the crop adjusted evapotranspiration value is further adjusted to account for any measured rainfall since the last irrigation. The rainfall adjusted evapotranspiration value is then divided by the average precipitation rate for the sprinkler heads 42 to determine run time for the actuation of each irrigation control valve 40. This average precipitation rate information is input by the user into the RAM 16. The controller 10 then actuates each irrigation control valve 40 for the duration of the programming code specified run time necessary to satisfy the watering needs of the vegetation.

Figure 2:
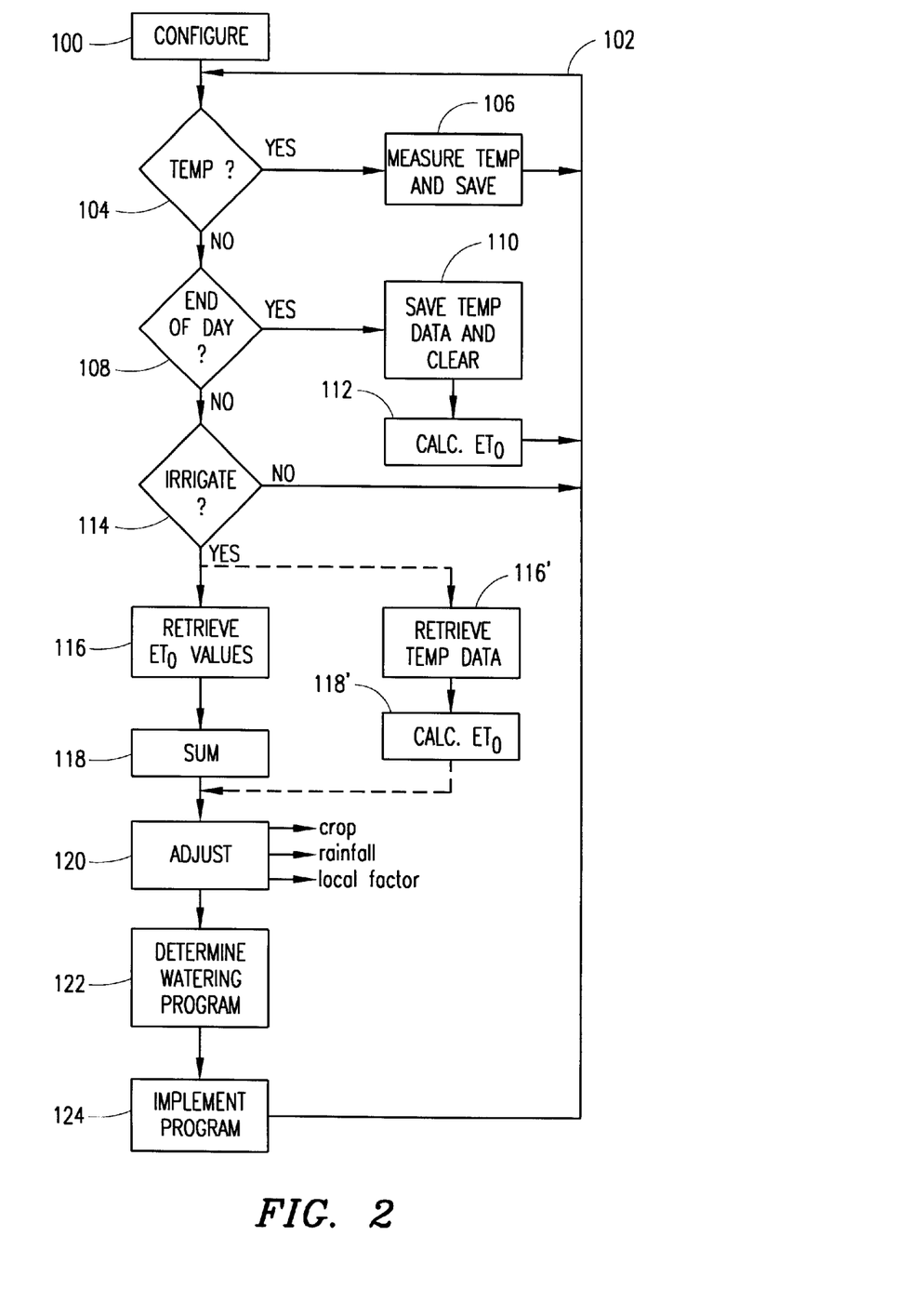
FIG. 2 is a flow diagram illustrating operation of the irrigation controller of FIG. 1.

Reference is now additionally made to FIG. 2 wherein there is shown a flow diagram illustrating operation of the irrigation controller 10 of FIG. 1 in accordance with its programming code. In general, the programming code for the controller 10 is designed to implement the Hargreaves equation for calculating a reference evapotranspiration value based on 1) daily temperature and 2) equivalent evaporation based on extraterrestrial radiation at the latitude of the site where the controller 10 is installed. This reference evapotranspiration value represents an estimation of the watering needs of a certain reference vegetation at the site. This reference evapotranspiration value is then adjusted to account for the specific type of vegetation at the site, rainfall, and local factors specific to the site which affect evapotranspiration rates. The resulting evapotranspiration value represents an estimation of the watering needs for the specific plants at that specific site. A watering time is then calculated from the resulting evapotranspiration value and sprinkler average precipitation rates to determine how long the irrigation system in each zone of the site must be actuated to replace lost water.

More specifically, the programming code for the controller 10 is executed as follows. First, in step 100, the user configures the controller 10 by inputting certain information such as: 1) an irrigation schedule (day and time of day when irrigation should occur); 2) type of soil at the site; 3) average precipitation rate for the sprinklers in each zone; 4) latitude of the site; 5) type of vegetation at the site (crop coefficient); and 6) a local adjustment factor which accounts for a local presumed average variation between the Hargreaves equation calculated evapotranspiration value for the site and either (1) actual watering needs (evapotranspiration) at the site or (2) Penman-Monteith, modified Penmans or other similar evapotranspiration equation calculated evapotranspiration value for the site. Most of this information need only be input once. Information relating to the irrigation schedule, plant type and local adjustment may have to be periodically changed by the user as the seasons change.

Next, the process for controller operation enters a loop (generally indicated at 102) for controlling irrigation operation. In step 104, a determination is made as to whether it is time to collect temperature data. This determination may be based upon a set schedule for temperature measurement (for example, certain times of the day), or upon a periodic measurement procedure (for example, once every thirty minutes each day). Clock 32 supplied information may be used to trigger a temperature measurement. If yes in step 104, the process makes (and perhaps stores) a temperature measurement in step 106 and returns to the top of the loop 102. Temperature data is read by the microprocessor 12 from the temperature sensor 22 and saved in the RAM 16 if it is either 1) higher than a currently stored high for the day, or 2) lower than a currently stored low for the day. The process then returns to the top of the loop 102.

If no in step 104, the process next determines in step 108 whether it is the end of the day (i.e., midnight). This determination is made by having the microprocessor 12 read the clock 32. If yes in step 108, step 110 is executed to save the currently stored high and low temperatures into a temperature record for that expired day, and the currently stored high and low temperatures are reset. Thus, for each passing day, the RAM 16 stores a record of the measured high and low temperatures for that day at the controller site. As an example, a first in, first out (FIFO) queue may be maintained in the RAM 16 for storing the daily high and low temperatures. This queue may be of any selected and supported size, but preferably has a size of at least thirty-one records in order to store a month's worth of temperature data.

In a first implementation of the process, following the temperature saving action of step 110, the process next calculates and saves in step 112 a reference evapotranspiration value for that day. The stored daily high and low temperature data from that day is extracted from memory and processed to provide high, low and differential temperature values. The extraterrestrial radiation influenced equivalent evaporation data for that day at the user input latitude for the controller site is also extracted from either a monthly or daily estimate table stored in the RAM 16. The high, low and differential temperature values and equivalent evaporation data are then preferably processed to calculate the reference evapotranspiration value for that day in accordance with the Hargreaves equation. The process then returns to the top of the loop 102. As an example, a first in, first out (FIFO) queue is maintained in the RAM 16 for storing the daily evapotranspiration values. This queue may be of any selected and supported size, but preferably has a size of at least thirty-one records in order to store a month's worth of evapotranspiration data.

If no in step 108, the process next determines in step 114 whether it is time to irrigate. This determination is made by having the microprocessor read the clock 32 and compare read month/day/time to the user input irrigation schedule. If no in step 114, the process then returns to the top of the loop 102. If yes in step 114, the first implementation of the process retrieves in step 116 the stored reference evapotranspiration values for each preceding day since a last irrigation event. These retrieved values are then summed in step 118 to produce a total reference evapotranspiration value which represents an estimation of the current watering needs of a certain reference vegetation at the site. In a second implementation of the process, step 112 above is skipped, and if yes in step 114, the stored high and low temperature data for each day since a last irrigation event are retrieved in step 116'. These retrieved values providing high, low and differential temperature values are then processed, along with equivalent evaporation data, in step 118' to calculate the reference evapotranspiration value for each day in accordance with the Hargreaves equation, with the daily values since a last irrigation event summed to produce a total reference evapotranspiration value which represents an estimation of the current watering needs of a certain reference vegetation at the site.

Next, in step 120, the process adjusts the total reference evapotranspiration value to account for the type of vegetation at the site, any measured rainfall and local factors specific to the site which affect evapotranspiration rates. The resulting net evapotranspiration value represents an estimation of the current watering needs for the specific plants at that specific site.

As an example of this step 120 adjustment, the reference evapotranspiration value is multiplied by the user input local adjustment factor. In this regard, it is recognized that the Hargreaves equation is not always completely accurate at some sites, and the local adjustment factor accounts for a local presumed average variation between the Hargreaves equation calculated evapotranspiration value for the site and either (1) actual watering needs (evapotranspiration) at the site or (2) an estimated Penman-Monteith, modified Penmans or other similar evapotranspiration equation calculated evapotranspiration value for the site. As another example of this step 120 adjustment the locally adjusted reference evapotranspiration value is multiplied by the user input crop coefficient to tailor the value to the specific vegetation at issue. This adjustment is made on a zone by zone (or program by program) basis as it is possible that different zones under the influence of a single controller may be populated with different types of vegetation. Thus, a certain crop coefficient may be applied for one zone which is populated by turf grass, and another crop coefficient may be applied to another zone which is populated by shrubbery. As yet another example of this step 120 adjustment, the gauge 46 (2) measured amount of rainfall since a last irrigation time is subtracted from the locally adjusted and/or crop adjusted reference evapotranspiration value. The result of this step 120 adjustment is the generation of a net evapotranspiration value.

In step 122, a watering program for the site is determined. This program takes into account not only the calculated resulting net evapotranspiration value, but also the average precipitation rates of the sprinkler(s) in each zone and the type of soil. The calculated resulting net evapotranspiration value comprises an amount of water to be applied (in inches or other equivalent metric standard) for each zone. A watering time for each zone is determined by dividing the calculated resulting net evapotranspiration value for the site/zone by the average precipitation rate (in inches/hour or other equivalent metric standard) for the sprinklers in each zone (or program) to determine how long the irrigation system in each zone (or program) of the site must be actuated to replace lost water. The program further specifies whether this watering time in each zone (or program) should be measured over a single application period or divided out over a plural number of application periods. This determination is made based on soil type in the zone as multiple application periods should be utilized with soils (like clays) having a low intake rate, and a single application period is suitable for soils (like sands) having a high intake rate. The soil type determination may also (or alternatively) take into account the surface contour (i.e., terrain conditions) for the soil of each zone (or program) as multiple application periods should be utilized with highly contoured (for example, hilly) zones subject to run-off concerns, and a single application period is suitable for flat contoured zones.

Next, in step 124, the determined watering program is implemented. This implementation is made on a zone by zone (or program by program) basis so that each zone (or program) receives the proper amount of irrigation for replacing lost water. Sprinkler head by sprinkler head implementation of the watering program may also be made. In situations where the moisture sensor 46(1) detects moisture (such as from a rain storm) concurrent with the implementation of the watering program, the actions of step 124 are suspended pending the next step 114 determination to irrigate. Furthermore, in situations where the sensor 22 measures a current temperature that is less than a certain value (indicative of a possible freeze or frost condition) the actions of step 124 are suspended pending the next step 114 determination to irrigate. The process then returns to the top of the loop 102.

Figure 3:
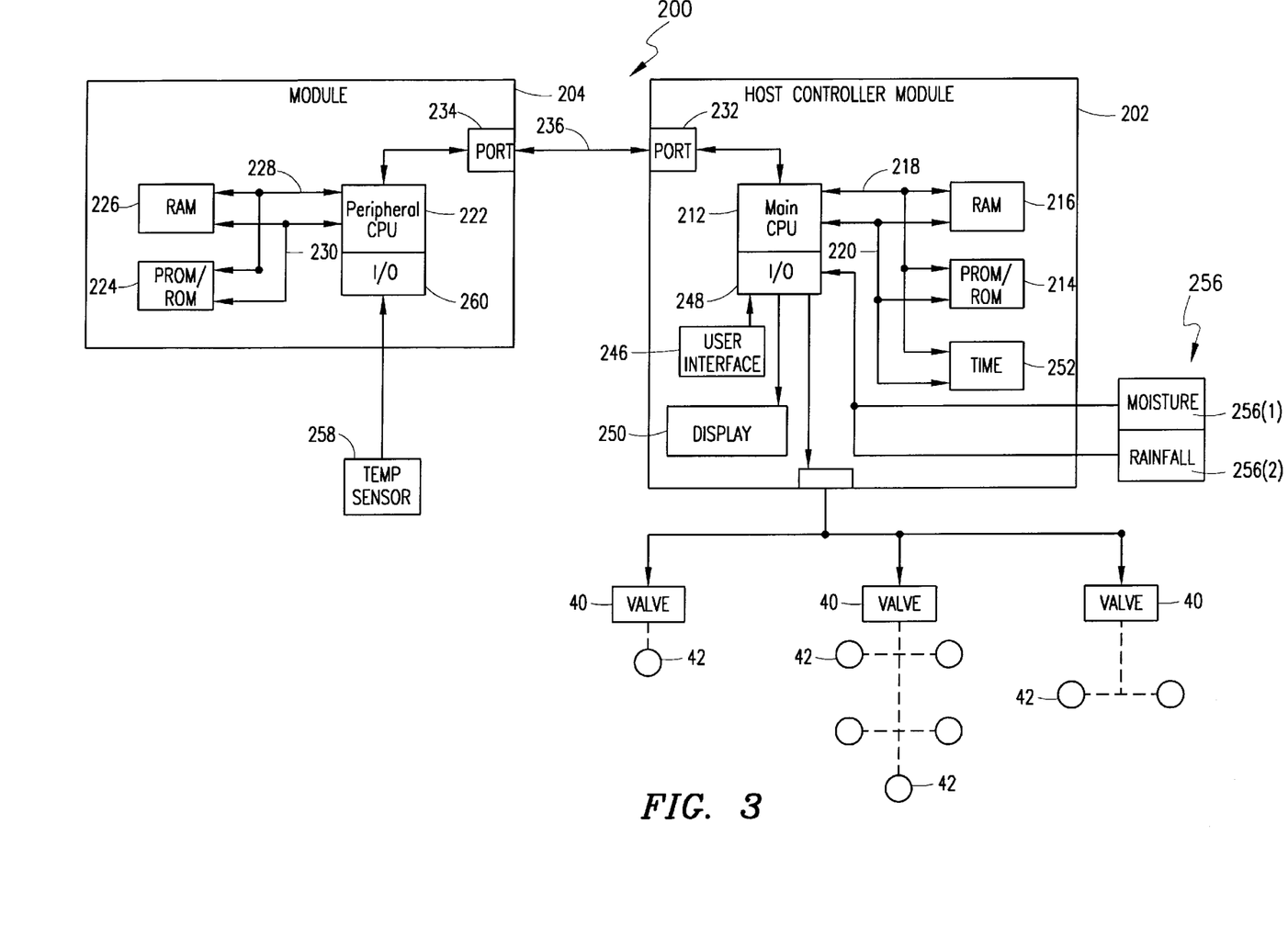
FIG. 3 is a block diagram of a modular irrigation controller in accordance with the present invention.

Reference is now made to FIG. 3 wherein there is shown a block diagram of a modular irrigation controller 200 in accordance with the present invention. The modular controller 200 comprises a host controller 202 and an evapotranspiration module 204. When not connected to the evapotranspiration module 204, the host controller 202 functions generally in the same manner as a conventional irrigation controller. In this regard, an irrigation schedule is programmed into the host controller 202 by the user which specifies not only the day and time of day when irrigation should occur, but also the run time for irrigation in each zone (or program). The host controller 202 then operates to keep track of the irrigation schedule and control the actuation of irrigation control valves 40 in accordance with that schedule for the user specified run time.

When the evapotranspiration module 204 is connected to the host controller 202, on the other hand, the combined controller 200 system functions generally in the manner of the controller 10 of FIG. 1. An irrigation schedule is programmed into the host controller 202 by the user which specifies the day and time of day when irrigation should occur. In one implementation, the user need not pre-program any run time, and the controller chooses an appropriate run time. In another implementation, a user selected run time is modified by the controller calculated run time if the user makes this selection. The evapotranspiration module 204 operates to process temperature data at the site and calculate a reference evapotranspiration value representing the amount of water lost since a last irrigation. This information is then communicated to the host controller 202. In response to receipt of the evapotranspiration information, the host controller 202 calculates a run time for each zone (or program), and then operates to control the actuation of irrigation control valves 40 in accordance with the irrigation schedule and for the duration of the calculated run time.

The host controller 202 includes a microprocessor (Main CPU) 212, a programmable read only memory (ROM/PROM) 214 and a random access memory (RAM) 216. The ROM/PROM 214 provides a non-volatile storage location for the programming code of the host controller along with certain important (permanent) data necessary for execution of the code. The RAM 216 provides a volatile storage location for certain (variable/temporary) data generated during execution of the programming code. The microprocessor 212 communicates with the ROM/PROM 214 and RAM 216 in a conventional manner utilizing an address bus 218 and a data bus 220. It will be understood that the ROM/PROM 214 and RAM 216 may be incorporated within or provided separate and apart from the microprocessor 212.

The evapotranspiration module 204 also includes a microprocessor (Peripheral CPU) 222 connected to a programmable read only memory (ROM/PROM) 224 and a random access memory (RAM) 226. The ROM/PROM 224 provides a non-volatile storage location for the programming code of the watering time determination module 204 along with certain important (permanent) data necessary for execution of the code. The RAM 226 provides a volatile storage location for certain (variable/temporary) data generated during execution of the programming code. The microprocessor 222 communicates with the ROM/PROM 224 and RAM 226 in a conventional manner utilizing an address bus 228 and a data bus 230. It will be understood that the ROM/PROM 224 and RAM 226 may be incorporated within or provided separate and apart from the microprocessor 222.

A first serial communications port 232 is connected to (or is incorporated in) the microprocessor 212 to support communications between the host controller 202 and external devices such as the evapotranspiration module 204 or a personal/laptop computer (not shown). Similarly, a second communications port 234 is connected to (or is incorporated in) the microprocessor 222 to support communications between the evapotranspiration module 204 and external devices such as the host controller 202 or a personal/laptop computer (not shown). The host controller 202 and evapotranspiration module 204 are connected for communication and data exchange through the first serial communications port 232 and the second communications port 234 over a serial data communications link 236.

Utilizing the first serial port 232, the programming code for host controller 202 operation that is stored in the ROM/PROM 214 may be updated and data may be extracted from or downloaded to the RAM 216. Similarly, utilizing the second serial port 234, the programming code for evapotranspiration module 204 operation that is stored in the ROM/PROM 224 may be updated and data may be extracted from or downloaded to the RAM 226. As an example, a table of extraterrestrial radiation influenced equivalent evaporation data for each month/day of the year at a plurality of latitudes may be downloaded into the ROM/PROM 224 or RAM 226 through the serial port 234. The serial ports 232 and 234 further allow a technician to have access to the microprocessors 212 and 222, respectively, for the purpose of performing diagnostic and maintenance operations on the controller 200.

A user interface 246 for supporting data entry into the host controller 202 is connected to the microprocessor 212 through an I/O interface 248. Input data may, if necessary, be stored in the RAM 216. Furthermore, using the serial communications link 236, the user interface 246 input data may be communicated to the evapotranspiration module 204 for storage in the RAM 226. The kinds of data input into the host controller 202, and perhaps communicated to the evapotranspiration module 204 include: a preferred time of day when irrigation (if necessary) is to be effectuated; a preferred day (or days) of the week when irrigation (if necessary) is to be effectuated; an identification of soil type for the irrigated area; an identification of the vegetation type (crop coefficient); controller 200 site latitude; sprinkler flow rates; and, a local irrigation adjustment factor. The user interface 246 may further be utilized to initiate certain microprocessor 212/222 and module 202/204 activities (such as, for example, an irrigation, a self test, or the like) without regard to the current state of programming code execution.

A display 250 (such as an LCD display) for supporting visual data presentation by the controller 200 is also connected through the I/O interface 248 to the microprocessor 212. Through the display 250, the host controller 202 may present time, day and date information. The display 250 may further be utilized by the microprocessor 212 to present a variety of menus for user consideration when entering data into the host controller 202 and evapotranspiration module 204, or inform the user concerning the status or state of controller operation.

A time of day clock 252 is connected to the microprocessor 212 through the address bus 218 and data bus 220. This clock 252 maintains a non-volatile record of month, day, hour of the day, minutes of the hour and seconds of the minute. The clock 252 time data is monitored by the microprocessor 212 with the time data driving certain operations by the host controller 202 and evapotranspiration module 204 in accordance with their programming codes. These operations include: reading and storing temperature data; initiating and stopping irrigation activities; and, performing certain irrigation related calculations (as will be described).

In accordance with the execution of the programming code, the microprocessor 212 outputs irrigation control signals through the I/O interface 248 to control the actuation of irrigation control valves 40. These control valves 40 operate to either allow or block the passage water to one or more sprinkler heads 42. The length of time each irrigation control valve 40 is actuated to allow the passage of water is calculated by the host controller 202 in response to evapotranspiration information determined and supplied by the evapotranspiration module 204 in accordance with the execution of their programming codes.

The host controller 202 further optionally receives input from other sensors 256 through the I/O interface 248. An example of such a sensor is a moisture sensor 256 (1). When the moisture sensor 256 (1) detects moisture, this is indicative of a rainfall event. During such a rainfall event, the microprocessor 212 suppresses host controller 202 actuation to sprinkle. Another example of such a sensor comprises a rainfall gauge 256 (2). Using rainfall information collected by the rainfall gauge sensor 256 (2), the microprocessor 212 adjusts (i.e., reduces) its programming code calculated irrigation amount of water which is needed to replace water lost through the effects of evapotranspiration.

A temperature sensor 258 is further provided for the evapotranspiration module 204, and is connected to the microprocessor 222 through an input/output (I/O) interface 260. In accordance with the operation of the programming code, temperature data collected by the sensor 258 is stored by the microprocessor 222 in the RAM 226. This temperature data is then retrieved and processed by the microprocessor 222 in accordance with the execution of the programming code to determine an amount of water which needs to be applied in order to replace water lost through the effects of evapotranspiration.

The daily temperature data of importance to the Hargreaves equation (high, low and differential) is calculated by the microprocessor 222 from the temperature information collected by the sensor 258 and stored in the RAM 226. The latitude of the controller site is input by the user through the host controller 202 and into the RAM 226 of the evapotranspiration module 204. Using this latitude data, date (month or day) sensitive equivalent evaporation data of importance to the Hargreaves equation is determined from a latitude based extraterrestrial radiation table stored in the ROM/PROM 214 (or 224 ). Once a reference evapotranspiration value is determined by the evapotranspiration module 204 from the Hargreaves equation, it is communicated as necessary (perhaps summed over a plurality of days since a last irrigation) to the host controller 202 at instances when an irrigation event occurs. This communicated evapotranspiration value is then adjusted by a local adjustment coefficient to account for presumed average variation between the Hargreaves equation calculated watering needs and either (1) actual watering needs or (2) Penman-Monteith, modified Penmans or other similar evapotranspiration equation calculated watering needs. The local adjustment coefficient is estimated and input by the user in the RAM 216. The value of this local adjustment coefficient is affected by factors such as site altitude, site shade conditions, local weather patterns and characteristics (humidity, aridity and the like), drainage and topology. The locally adjusted evapotranspiration value is then further adjusted by the crop coefficient to account for the specific type of vegetation being sprinkled. The crop coefficient is input by the user into the RAM 216 of the host controller 202. Next, the crop adjusted evapotranspiration value is further adjusted by any measured rainfall, and the resulting net evapotranspiration value is divided by the average precipitation rate for the sprinkler heads 42 to determine run time for the actuation of each irrigation control valve 40. This average precipitation rate information is input by the user in the RAM 216 of the host controller 202. The host controller 202 then actuates each irrigation control valve 40 for the duration of the programming code specified run time necessary to satisfy the watering needs of the vegetation.

Figure 4:
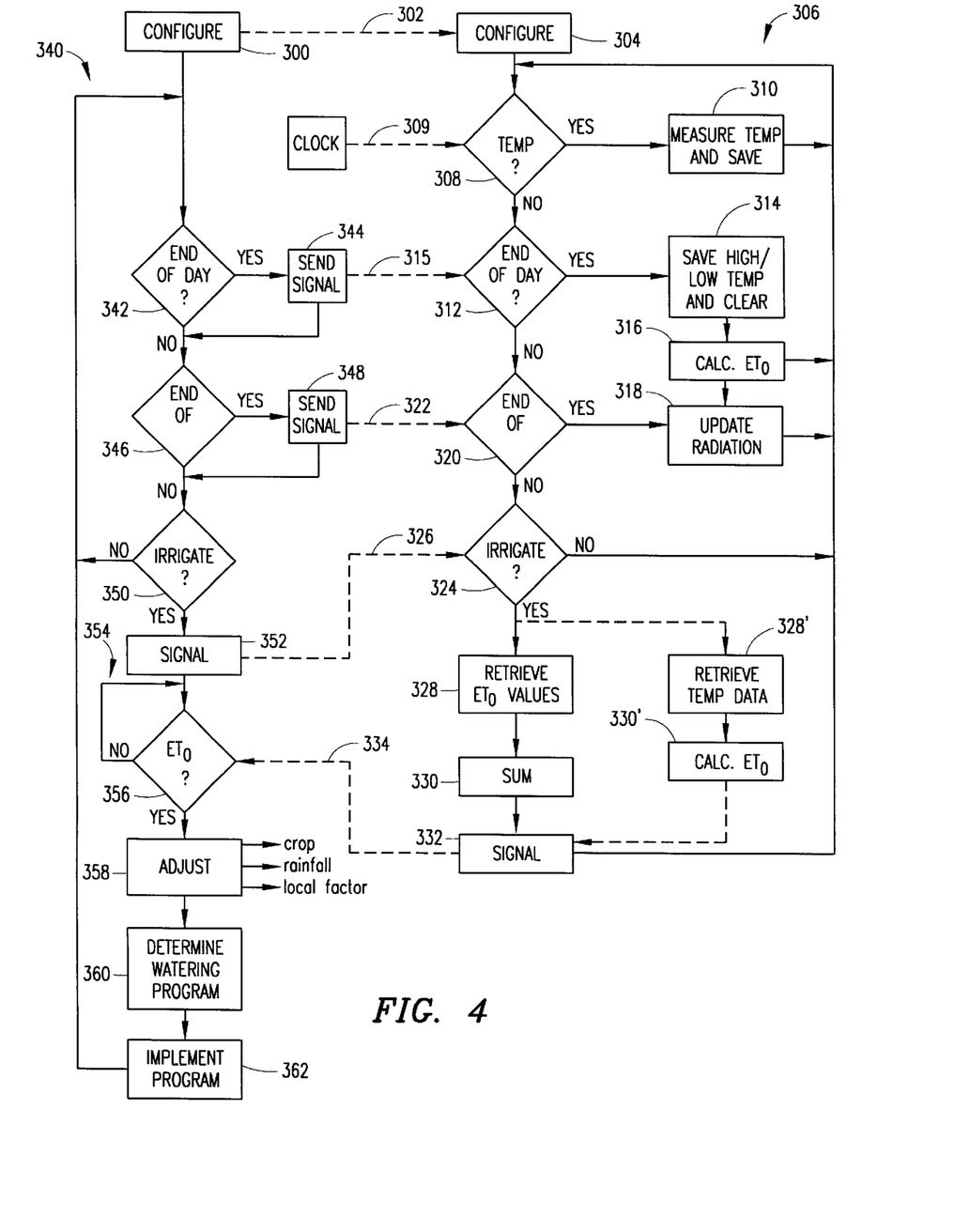
FIG. 4 is a flow diagram illustrating operation of the modular irrigation controller of FIG. 3.

Reference is now additionally made to FIG. 4 wherein there is shown a flow diagram illustrating operation of the modular irrigation controller of FIG. 3. In FIG. 4, operation steps illustrated on the left hand side are performed by the host controller 202 in accordance with its programming code, and operation steps illustrated on the right hand side are performed by the evapotranspiration module 204 in accordance with its programming code. In general, the programming code for the evapotranspiration module 204 is designed to implement the Hargreaves equation for calculating a reference evapotranspiration value based on 1) daily temperature and 2) equivalent evaporation based on extraterrestrial radiation at the latitude of the site where the controller 200 is installed. This reference evapotranspiration value represents an estimation of the watering needs of a certain reference vegetation at the site. This reference evapotranspiration value is then adjusted by the programming code of the host controller 202 to account for the type of vegetation at the site, rainfall, and local factors specific to the site which affect evapotranspiration rates. The resulting net evapotranspiration value represents an estimation of the watering needs for the specific plants at that specific site. A watering time is then calculated by the host controller 202 from the resulting net evapotranspiration value and sprinkler average precipitation rates to determine how long the irrigation system in each zone (or program) of the site must be actuated to replace lost water.

More specifically, the programming codes for the host controller 202 and evapotranspiration module 204 are executed as follows. First, in step 300, the user configures the controller 200 by inputting certain information into the host controller 202 such as: 1) an irrigation schedule (day and time of day when irrigation should occur); 2) type of soil at the site; 3) average precipitation rate for the sprinklers in each zone (or program); 4) latitude of the site; 5) type of vegetation at the site (crop coefficient); and 6) a local adjustment factor which accounts for a local presumed average variation between the Hargreaves equation calculated evapotranspiration value for the site and either (1) actual watering needs (evapotranspiration) at the site or (2) Penman-Monteith, modified Penmans or other similar evapotranspiration equation calculated evapotranspiration value for the site. Most of this information need only be input once. Information relating to the irrigation schedule, plant type and local adjustment may have to be periodically changed by the user as the seasons change. Certain user input information (such as the latitude information) and other information (such as the current month/day) may need to be communicated using signal 302 to configure 304 the evapotranspiration module.

Next, the process for the evapotranspiration module enters a loop (generally indicated at 306) for making daily reference evapotranspiration value determinations. In step 308, a determination is made as to whether it is time to collect temperature data. This determination may be based upon a set schedule for temperature measurement (for example, certain times of the day), or upon a periodic measurement procedure (for example, once every thirty minutes each day). To support this determination, the clock of the host controller signals 309 time information to the evapotranspiration module. If yes in step 308, the process makes (and perhaps stores) a temperature measurement in step 310 and returns to the top of the loop 306. Temperature data is read by the microprocessor 222 from the temperature sensor 258 and saved in the RAM 226 if it is either 1) higher than a currently stored high for the day, or 2) lower than a currently stored low for the day.

If no in step 308, the process next determines in step 312 whether it is the end of the day (i.e., midnight). To support this determination, the host controller signals 315 end of the day time information to the evapotranspiration module. If yes in step 312, step 314 is executed to save the currently stored high and low temperatures into a temperature record for that expired day, and the currently stored high and low temperatures are reset. Thus, for each passing day, the RAM 226 stores a record of the measured high and low temperatures for that day at the controller 200 site. As an example, a first in, first out (FIFO) queue is maintained in the RAM 226 for storing the daily high and low temperatures. This queue may be of any selected and supported size, but preferably has a size of at least thirty-one records in order to store a month's worth of temperature data.

In a first implementation of the process, following the temperature saving action of step 314, the process next calculates and saves in step 316 a reference evapotranspiration value for that day. The stored daily high and low temperature data from that day is extracted from memory and processed to provide high, low and differential temperature values. The extraterrestrial radiation influenced equivalent evaporation data for that day at the user input latitude for the controller site is also extracted from either a monthly or daily estimate table stored in the ROM/PROM 214 (or 224). The high, low and differential temperature values and equivalent evaporation data are then preferably processed to calculate the reference evapotranspiration value for that day in accordance with the Hargreaves equation. In one embodiment of the invention where the extraterrestrial radiation influenced equivalent evaporation data is specified on a per month basis, the process then returns to the top of the loop 306. In another embodiment where the extraterrestrial radiation influenced equivalent evapotranspiration data is specified on a per day basis, the process next updates in step 318 the extraterrestrial radiation influenced equivalent evaporation data so that it is accurate for the next day. The process then returns to the top of the loop 306. As an example, a first in, first out (FIFO) queue is maintained in the RAM 226 for storing the daily evapotranspiration values. This queue may be of any selected and supported size, but preferably has a size of at least thirty-one records in order to store a month's worth of evapotranspiration data.

If no in step 312, the process next determines in step 320 whether it is the end of the month. To support this determination, the host controller signals 322 end of the month time information to the evapotranspiration module. If yes in step 320, step 318 is executed to update the extraterrestrial radiation influenced equivalent evaporation data so that it is accurate for the next month. The process then returns to the top of the loop 306.

If no in step 320, the process next determines in step 324 whether it is time to irrigate. To support this determination, the host controller signals 326 the evapotranspiration module with an irrigation alarm (perhaps specifying a number of days since a last irrigation event). If no in step 324, the process then returns to the top of the loop 306. If yes in step 324, on the other hand, in accordance with the first implementation, the process next retrieves in step 328 the stored reference evapotranspiration values for each preceding day since a last irrigation event. These retrieved values are then summed in step 330 to produces a total reference evapotranspiration value which represents an estimation of the current watering needs of a certain reference vegetation at the site. In accordance with a second implementation of the process, step 316 above is skipped, and if yes in step 324, the stored high and low temperature data for each day since a last irrigation event are retrieved in step 328'. These retrieved values providing high, low and differential temperature values are then processed, along with equivalent evaporation data, in step 330' to calculate the reference evapotranspiration value for each day in accordance with the Hargreaves equation, with the daily values since a last irrigation event summed to produce a total reference evapotranspiration value which represents an estimation of the current watering needs of a certain reference vegetation at the site. This summed reference evapotranspiration is then communicated 332 to the host controller in an evapotranspiration signal 334. The process then returns to the top of the loop 306.

Simultaneously with the evapotranspiration module process execution relating to loop 306, the host controller operation enters a loop (generally indicated at 340) for controlling irrigation operation. In step 342, the process determines whether it is the end of the day (i.e., midnight). This determination is made by having the microprocessor 212 read the clock 252. If yes in step 342, the host controller communicates 344 with the evapotranspiration module using signal 314. As mentioned above, this end of the day signal 314 triggers evapotranspiration module operation to save daily high and low temperatures, calculate a daily reference evapotranspiration and (perhaps) update daily extraterrestrial radiation influenced equivalent evaporation data.

If no in step 342, or following execution of step 344, the process next determines in step 346 whether it is the end of a predefined time period (such as a month). This determination is made by having the microprocessor 212 read the clock 252. If yes in step 346, the host controller communicates 348 with the evapotranspiration module using signal 322. As mentioned above, this end of the time period (month) signal 322 triggers evapotranspiration module operation to update monthly extraterrestrial radiation influenced equivalent evaporation data.

If no in step 346, or following execution of step 348, the process next determines in step 350 whether it is time to irrigate. This determination is made by having the microprocessor 212 read the clock 252 and compare read month/day/time to the user input irrigation schedule. If no in step 350, the process then returns to the top of the loop 340. If yes in step 350, the host controller communicates 352 with the evapotranspiration module using signal 326. As mentioned above, this irrigation signal 326 triggers evapotranspiration module operation to retrieve and sum daily reference evapotranspiration values, and further return in signal 334 reporting the total reference evapotranspiration value for further host controller processing.

Following execution of step 352, the process enters a waiting loop 354, and tests in step 356 whether the evapotranspiration module has sent, and the host controller has received, the evapotranspiration signal 334. If no in step 356, the process passes again through the waiting loop 354 and tests 356 again for the signal 334. If yes in step 356, the process next adjusts the reported total reference evapotranspiration value in step 358 to account for local factors specific to the site which affect evapotranspiration rates, the type of vegetation at the site and any measured rainfall. The resulting net evapotranspiration value represents an estimation of the current watering needs for the specific plants at that specific site.

As an example of this step 358 adjustment, the total reference evapotranspiration value is multiplied by the user input local adjustment factor. In this regard, it is recognized that the Hargreaves equation is not always completely accurate at some sites, and the local adjustment factor accounts for a local presumed average variation between the Hargreaves equation calculated evapotranspiration value for the site and either (1) actual watering needs (evapotranspiration) at the site or (2) an estimated Penman-Monteith, modified Penmans or other similar evapotranspiration equation calculated evapotranspiration value for the site. The locally adjusted evapotranspiration value is then further adjusted in step 358 by the user input crop coefficient to tailor the value to the specific vegetation at issue. This adjustment is made on a zone by zone (or program by program) basis as it is possible that different zones under the influence of a single controller may be populated with crops having different types of vegetation. Thus, a certain crop coefficient may be applied for one zone which is populated by turf grass, and another crop coefficient may be applied to another zone which is populated by shrubbery. As another example of this step 358 adjustment, the gauge 256(2) measured amount of rainfall since a last irrigation time is subtracted from the locally adjusted or crop adjusted reference evapotranspiration value.

In step 360, a watering program for the site is determined. This program takes into account not only the calculated resulting evapotranspiration value, but also the average precipitation rates of the sprinklers in each zone (or program) and the type of soil. The calculated resulting evapotranspiration value comprises an amount of water to be applied (in inches). A watering time for each zone (or program) is determined by dividing the calculated resulting evapotranspiration value for the site/zone by the average precipitation rate (in inches/minute) for the sprinklers in each zone (or program) to determine how long the irrigation system in each zone (or program) of the site must be actuated to replace lost water. The watering time may alternatively be specified on a sprinkler head by sprinkler head basis. The program further specifies whether this watering time in each zone (or program) should be measured over a single application period or divided out over a plural number of application periods. This determination is made based on soil type in the zone as multiple application periods should be utilized with soils (like clays) having a low intake rate, and a single application period is suitable for soils (like sands) having a high intake rate. The soil type determination may also (or alternatively) take into account the surface contour (i.e., terrain conditions) for the soil of each zone (or program) as multiple application periods should be utilized with highly contoured (for example, hilly) zones subject to run-off concerns, and a single application period is suitable for flat contoured zones.

Next, in step 362, the determined watering program is implemented. This implementation is made on a zone by zone (or program by program) basis so that each zone (or program) receives the proper amount of irrigation for replacing lost water. Sprinkler head by sprinkler head application may also be made. In situations where the moisture sensor 256(1) detects moisture (such as from a rain storm) concurrent with the implementation of the watering program, the actions of step 362 are suspended pending the next step 350 determination to irrigate. Furthermore, in situations where the evapotranspiration module 204 reports a sensor 258 measured current temperature to the host controller 202 that is less than a certain value (indicative of a possible freeze or frost condition) the actions of step 362 are suspended pending the next step 350 determination to irrigate. The process then returns to the top of the loop 340.

Figure 5:
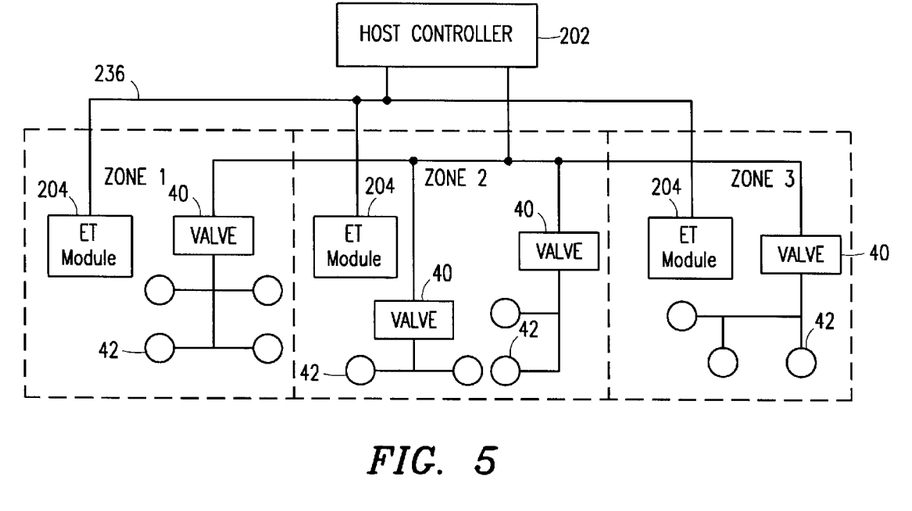
FIG. 5 is a block diagram of an alternate embodiment of a modular irrigation controller in accordance with the present invention.

Reference is now made to FIG. 3 and also to FIG. 5 wherein there is shown a block diagram of an alternate embodiment of a modular irrigation controller in accordance with the present invention. In this alternate embodiment of the modular irrigation controller of FIG. 3 (where like reference numerals refer to like or similar parts), the host controller 202 is connected to a plurality of evapotranspiration modules 204. Each module 204 is positioned in a certain zone (area) of the site whose irrigation needs are controlled by the module 202. One advantage of this configuration is that temperature variations from zone to zone (which affect evapotranspiration) can be accounted for thus allowing for a more accurate irrigation calculation. An irrigation schedule is programmed into the host controller 202 by the user which specifies the day and time of day when irrigation should occur. In one implementation, the user need not pre-program any run time, and the controller chooses an appropriate run time. In another implementation, a user selected run time is modified by the controller calculated run time if the user makes this selection. The evapotranspiration modules 204 operate to process temperature data at each of the certain zones of the site and calculate a reference evapotranspiration value representing the amount of water lost at that zone since a last irrigation. This information is then communicated to the host controller 202. In response to receipt of the evapotranspiration information, the host controller 202 calculates a run time for each zone (or program), and then operates to control the actuation of irrigation control valves 40 in each zone (or program) in accordance with the irrigation schedule and for the duration of the zone specific calculated run time.

Each of the evapotranspiration modules 204 is given a unique address. Addressed communications are then exchanged between the evapotranspiration modules 204 and the host controller 202 via the serial communications port 232, the serial communications port 234 and the serial data communications link 236. Unique addressing supports zone specific accuracy in making evapotranspiration calculations based on temperature.

The daily temperature data of importance to the Hargreaves equation (high, low and differential) is calculated by the microprocessor 222 from the temperature information collected by the sensor 258 and stored in the RAM 226. The latitude of the controller site is input by the user through the host controller 202 and into the RAM 226 of the evapotranspiration module 204. Using this latitude data, date (month or day) sensitive equivalent evaporation data of importance to the Hargreaves equation is determined from a latitude based extraterrestrial radiation table stored in the ROM/PROM 214. Once a reference evapotranspiration value is determined by the evapotranspiration module 204 from the Hargreaves equation, it is communicated as necessary (perhaps summed over a plurality of days since a last irrigation) to the host controller 202 at instances when an irrigation event occurs. The communicated evapotranspiration values received from the plurality of modules 204 are then each individually adjusted by a local adjustment coefficient to account for presumed average variation between the Hargreaves equation calculated watering needs and either (1) actual watering needs or (2) Penman-Monteith, modified Penmans or other similar evapotranspiration equation calculated watering needs for the precise zone. The local adjustment coefficient is estimated and input by the user in the RAM 216. The value of this local adjustment coefficient is affected by factors such as site altitude, site shade conditions, local weather patterns and characteristics (humidity, aridity and the like), drainage and topology related to the particular zone at issue. The locally adjusted evapotranspiration values for each zone (or program) are then further adjusted by the crop coefficient for each respective zone to account for the specific type of vegetation being sprinkled. The crop coefficient is input by the user into the RAM 216 of the host controller 202. Next, the crop adjusted evapotranspiration values for each zone (or program) are further adjusted by any measured rainfall, and the resulting net evapotranspiration values are divided by the average precipitation rate for the sprinkler heads 42 in the respective zones to determine run time for the actuation of each irrigation control valve 40. This average precipitation rate information is input by the user in the RAM 216 of the host controller 202. The host controller 202 then actuates each irrigation control valve 40 for the duration of the programming code specified run time necessary to satisfy the watering needs of the vegetation in that zone.

Figure 6:
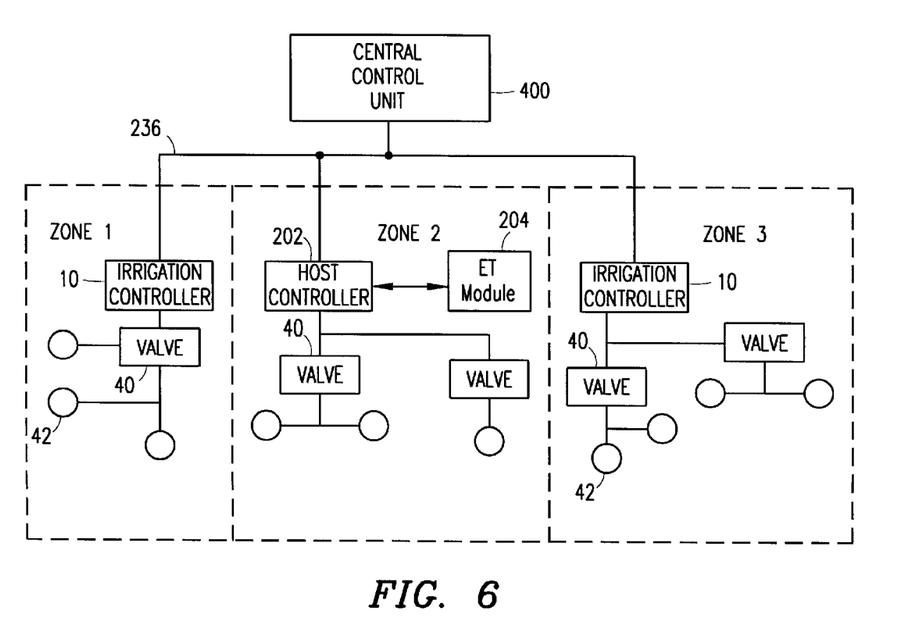
FIG. 6 is a block diagram of a command/satellite irrigation control system in accordance with the present invention.

Reference is now made to FIGS. 1 and 3 and also to FIG. 6 wherein there is shown a block diagram of a command/satellite irrigation control system in accordance with the present invention. In this alternate embodiment of the irrigation controller of FIG. 1 (where like reference numerals refer to like or similar parts) and the modular irrigation controller of FIG. 3 (where like reference numerals refer to like or similar parts), a centralized control unit 400 is provided in communication with either or both an irrigation controller 10 (having an integrated evapotranspiration functionality) or a host controller 202 (which is connected to at least one evapotranspiration module 204). The centralized control unit 400 may preferably comprise a personal computer (PC) with software for managing water resources and controlling and programming the irrigation controller 10, host controller 202 and/or evapotranspiration module 204. The irrigation controller 10 communicates with the centralized control unit 40 through its serial communications port 232, the serial communications port 234 and the serial data communications link 236. Similarly, the central control unit 400 communicates with the host controller 202 and/or evapotranspiration module 204 using the serial communications port 232 and the serial communications port 234, respectively. Accordingly, the central control unit 400, irrigation controller 10, host controller 202 and evapotranspiration module 204 are networked together using the data communications link 236 with each node or element in this network being given a unique address.

In the irrigation controller 10, the daily temperature data of importance to the Hargreaves equation (high, low and differential) is calculated by the microprocessor 12 from the temperature information collected by the sensor 22 and stored in the RAM 16. Similarly, in each evapotranspiration module 204, the daily temperature data of importance to the Hargreaves equation (high, low and differential) is calculated by the microprocessor 222 from the temperature information collected by the sensor 258 and stored in the RAM 226. Using stored latitude data, date (month or day) sensitive equivalent evaporation data of importance to the Hargreaves equation is determined from a latitude based extraterrestrial radiation table. A reference evapotranspiration value is then determined from the Hargreaves equation (and is perhaps summed over a plurality of days since a last irrigation) at instances when an irrigation event occurs. For the host controller 202 and evapotranspiration module 204 configuration, the reference evapotranspiration values are communicated as necessary (perhaps summed over a plurality of days since a last irrigation) to the host controller at instances when an irrigation event occurs. In either the irrigation controller 10 or the host controller 202, the reference evapotranspiration value is then adjusted by a local adjustment coefficient to account for presumed average variation between the Hargreaves equation calculated watering needs and either (1) actual watering needs or (2) Penman-Monteith, modified Penmans or other similar evapotranspiration equation calculated watering needs. The value of this local adjustment coefficient is affected by factors such as site altitude, site shade conditions, local weather patterns and characteristics (humidity, aridity and the like), drainage and topology. The locally adjusted evapotranspiration value is then adjusted by the crop coefficient to account for the specific type of vegetation being sprinkled. Next, the crop adjusted evapotranspiration value is further adjusted to account for any measured rainfall since the last irrigation. The rainfall adjusted evapotranspiration value is then divided by the average precipitation rate for the sprinkler heads 42 to determine run time for the actuation of each irrigation control valve 40. The controller 10 and/or host controller 202 then actuates each irrigation control valve 40 for the duration of the programming code specified run time necessary to satisfy the watering needs of the vegetation. If requested by the control unit 400, permission to water for the calculated run time per zone may be requested by controller 10 and/or host controller 202 before actuation of the control valves 40. This gives the site operator an option to pre-approve all watering. Autonomous regulated control over watering may further be implemented through and in accordance with the programming of the central control unit 400 wherein the requested watering needs are compared to a watering budget, with the central control unit granting permission to actuate the control valves only if the requested irrigation amounts meet any imposed budget limitations. When the watering budget would be exceeded by the requested irrigation, the central control unit 400 may either deny irrigation completely, or alternatively respond to the controller 10 and/or host controller 202 with permission to irrigate at a reduced (i.e., less than requested) amount.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An irrigation controller, comprising:
    a memory for storing extraterrestrial radiation influenced equivalent evaporation data for a certain site;
    means for measuring temperature data at that certain site;
    a processing unit connected to the memory and receptive of the temperature data, the processing unit operable to execute an irrigation application program which:
        calculates solely from the received temperature data and the stored extraterrestrial radiation influenced equivalent evaporation data relating to the certain site a reference evapotranspiration value indicative of an estimation of the current watering needs of a certain reference vegetation at that certain site;
        adjusts the reference evapotranspiration value to account for both a user specified local adjustment factor and a type of vegetation at the site, wherein the local adjustment factor accounts for noted regionalization inaccuracies in the solely temperature/radiation calculated reference evapotranspiration value, to calculate a net evapotranspiration value indicative of an estimation of the current watering needs of the type of vegetation at that certain site;
        determines a watering program for the certain site; and
        implements the determined watering program to have the processing unit issue commands for controlling the actuation of irrigation control valves at the site to replace lost water.

2. The irrigation controller as in claim 1 wherein the processing unit calculation of the reference evapotranspiration value based solely on the received temperature data and the stored extraterrestrial radiation influenced equivalent evaporation data is effectuated in accordance with the Hargreaves equation for evapotranspiration.

3. The irrigation controller as in claim 2 wherein the processing unit adjustment of the reference evapotranspiration value to account for the user specified local adjustment factor accounts for a noted deviation between the Hargreaves equation calculated evapotranspiration and actual watering needs at the certain site.

4. The irrigation controller as in claim 2 wherein the processing unit adjustment of the reference evapotranspiration value to account for the user specified local adjustment factor accounts for a noted deviation between the Hargreaves equation calculated evapotranspiration and weather station climatic information driven evapotranspiration equation calculated evapotranspiration at the certain site.

5. The irrigation controller as in claim 4 wherein the weather station climatic information driven evapotranspiration equation comprises the Penman-Monteith or modified Penman evapotranspiration equations.

6. The irrigation controller as in claim 1 wherein the processing unit determination of the watering program:
    divides the net evapotranspiration value for the certain site by the average precipitation rate for sprinklers connected to the irrigation control valves to determine a run time specifying how long individual irrigation control valves must be actuated.

7. The irrigation controller as in claim 6 wherein the run time is determined on a zone by zone or program by program basis for the irrigation control valves and connected sprinklers at the certain site.

8. The irrigation controller as in claim 6 wherein the processing unit determination-of the watering program further:
    measures the determined run time out over one or more application periods based on soil type or terrain conditions.

9. The irrigation controller as in claim 2 further including means for receiving measured rainfall data at that certain site, said means connected to the processing unit, and wherein the processing unit further accounts for any measured rainfall in calculating the current watering needs.

10. The irrigation controller as in claim 1 wherein the net reference evapotranspiration value is determined on a zone by zone or program by program basis at the certain site.

11. A method for controlling irrigation, comprising the steps of:
    measuring temperature data at a certain site;
    calculating solely from the measured temperature data and extraterrestrial radiation influenced equivalent evaporation data relating to the certain site a reference evapotranspiration value indicative of an estimation of the current watering needs of a certain reference vegetation at that certain site;
    adjusting the reference evapotranspiration value to account for both a user specified local adjustment factor and a type of vegetation at the site, wherein the local adjustment factor accounts for noted regionalization inaccuracies in the solely temperature/radiation calculated reference evapotranspiration value, to calculate a net evapotranspiration value indicative of an estimation of the current watering needs of the type of vegetation at that certain site;
    determining a watering program for the certain site; and
    implementing the determined watering program to have the processing unit issue commands for controlling the actuation of irrigation control valves at the site to replace lost water.

12. The method as in claim 11 wherein the step of calculating the reference evapotranspiration value based solely on the measured temperature data and the stored extraterrestrial radiation influenced equivalent evaporation data comprises the step of utilizing the Hargreaves equation to make the calculation.

13. The method as in claim 12 wherein the step of adjusting the reference evapotranspiration value to account for the user specified local adjustment factor comprises the step of accounting for a noted deviation between the Hargreaves equation calculated evapotranspiration and actual watering needs at the certain site.

14. The method as in claim 12 wherein the step of adjusting the reference evapotranspiration value to account for the user specified local adjustment factor comprises the step of accounting for a noted deviation between the Hargreaves equation calculated evapotranspiration and weather station climatic information driven evapotranspiration equation calculated evapotranspiration at the certain site.

15. The method as in claim 14 wherein the weather station climatic information driven evapotranspiration equation comprises the Penman-Monteith or modified Penman evapotranspiration equations.

16. The method as in claim 11 wherein the step of determining the watering program comprises the step of:
    dividing the net evapotranspiration value for the certain site by the average precipitation rate for sprinklers connected to the irrigation control valves to determine a run time specifying how long the irrigation control valves must be actuated.

17. The method as in claim 16 wherein the step of determining run time further comprises the step of determining the run time on a zone by zone or program by program basis for the irrigation control valves and connected sprinklers at the certain site.

18. The method as in claim 16 wherein the step of determining the watering program further comprises the step of:
measuring the determined run time out over one or more application periods based on soil type or terrain conditions.

19. The method as in claim 12 further including the step of measuring rainfall at that certain site, and wherein the step of adjusting the net reference evapotranspiration value further comprises the step of accounting for any measured rainfall in calculating the current watering needs.

20. The method as in claim 11 wherein the steps of measuring and calculating are performed by an evapotranspiration module, and the steps of adjusting, determining and implementing are performed by an irrigation controller, and further wherein the evapotranspiration module is connected to the irrigation controller by a bus communications connection, the method further including the steps of:
having the irrigation controller request from the evapotranspiration module at each instance of an irrigation event the reference evapotranspiration value using a first bus communications signal sent over the bus communications connection; and
having the evapotranspiration module respond to the first bus communications signal request by sending the calculated reference evapotranspiration value in a second bus communications signal sent over the bus communications connection.

21. The method as in claim 11 wherein the step of determining the net evapotranspiration value comprises the step of determining the net evapotranspiration value on a zone by zone or program by program basis at the certain site.

22. An irrigation control apparatus, comprising:
an evapotranspiration module operating to calculate solely from measured temperature data at a certain site and extraterrestrial radiation influenced equivalent evaporation data for the certain site a reference evapotranspiration value indicative of an estimation of the current watering needs of a certain reference vegetation at the certain site;
an irrigation controller operating to issue commands for controlling the actuation of irrigation control valves at the certain site in accordance with a watering program, the irrigation controller further operating to request at each instance of an irrigation event the reference evapotranspiration value from the evapotranspiration module and process the received reference evapotranspiration value to:
adjust the reference evapotranspiration value to account for both a user specified local adjustment factor and a type of vegetation at the certain site, wherein the local adjustment factor accounts for noted regionalization inaccuracies in the solely temperature/radiation calculated reference evapotranspiration value, to calculate a net evapotranspiration value indicative of an estimation of the current watering needs of the type of vegetation at that certain site;
determine a watering program for the certain site; and
implement the determined watering program to have the processing unit issue commands for controlling the actuation of irrigation control valves at the site to replace lost water.

23. The irrigation control apparatus as in claim 22 wherein the evapotranspiration module calculation of the reference evapotranspiration value is effectuated in accordance with the Hargreaves equation for evapotranspiration, and wherein the irrigation controller adjustment of the reference evapotranspiration value accounts for a noted deviation between the Hargreaves equation calculated evapotranspiration and actual watering needs at the certain site.

24. The irrigation control apparatus as in claim 22 wherein the evapotranspiration module calculation of the reference evapotranspiration value is effectuated in accordance with the Hargreaves equation for evapotranspiration, and wherein the irrigation controller adjustment of the reference evapotranspiration value accounts for a noted deviation between the Hargreaves equation calculated evapotranspiration and weather station climatic information driven evapotranspiration equation calculated evapotranspiration at the certain site.

25. The irrigation control apparatus as in claim 22 wherein the irrigation controller determination of the watering program:
divides the net evapotranspiration value for the certain site by the average precipitation rate for sprinklers connected to the irrigation control valves to determine a run time specifying how long the irrigation control valves must be actuated.

26. The irrigation control apparatus as in claim 22 further comprising a plurality of evapotranspiration modules in networked communication with the irrigation controller, each evapotranspiration module associated with a different irrigation zone, and each evapotranspiration module operating to calculate solely from measured temperature data at its zone and extraterrestrial radiation influenced equivalent evaporation data a reference evapotranspiration value indicative of an estimation of the current watering needs of a certain reference vegetation at that zone.

27. An evapotranspiration module for connection to an irrigation controller, comprising:
a communications port supporting bus communications with the irrigation controller;
a processing unit operating to calculate solely from measured temperature data at a certain site and extraterrestrial radiation influenced equivalent evaporation data for that certain site a reference evapotranspiration value indicative of an estimation of the current watering needs of a certain reference vegetation at the certain site; and
means responsive to a first bus communication received at the communications port from the irrigation controller which requests reference evapotranspiration value information for sending in a second bus communication output from the communications port to the irrigation controller the processing unit calculated reference evapotranspiration value.

28. The evapotranspiration module as in claim 27 wherein the processing unit calculation of the reference evapotranspiration value is effectuated in accordance with the Hargreaves equation for evapotranspiration.

29. The evapotranspiration module as in claim 27 wherein the communications port connects with the irrigation controller over a serial data communications bus.

* * * * *